Figure 1:
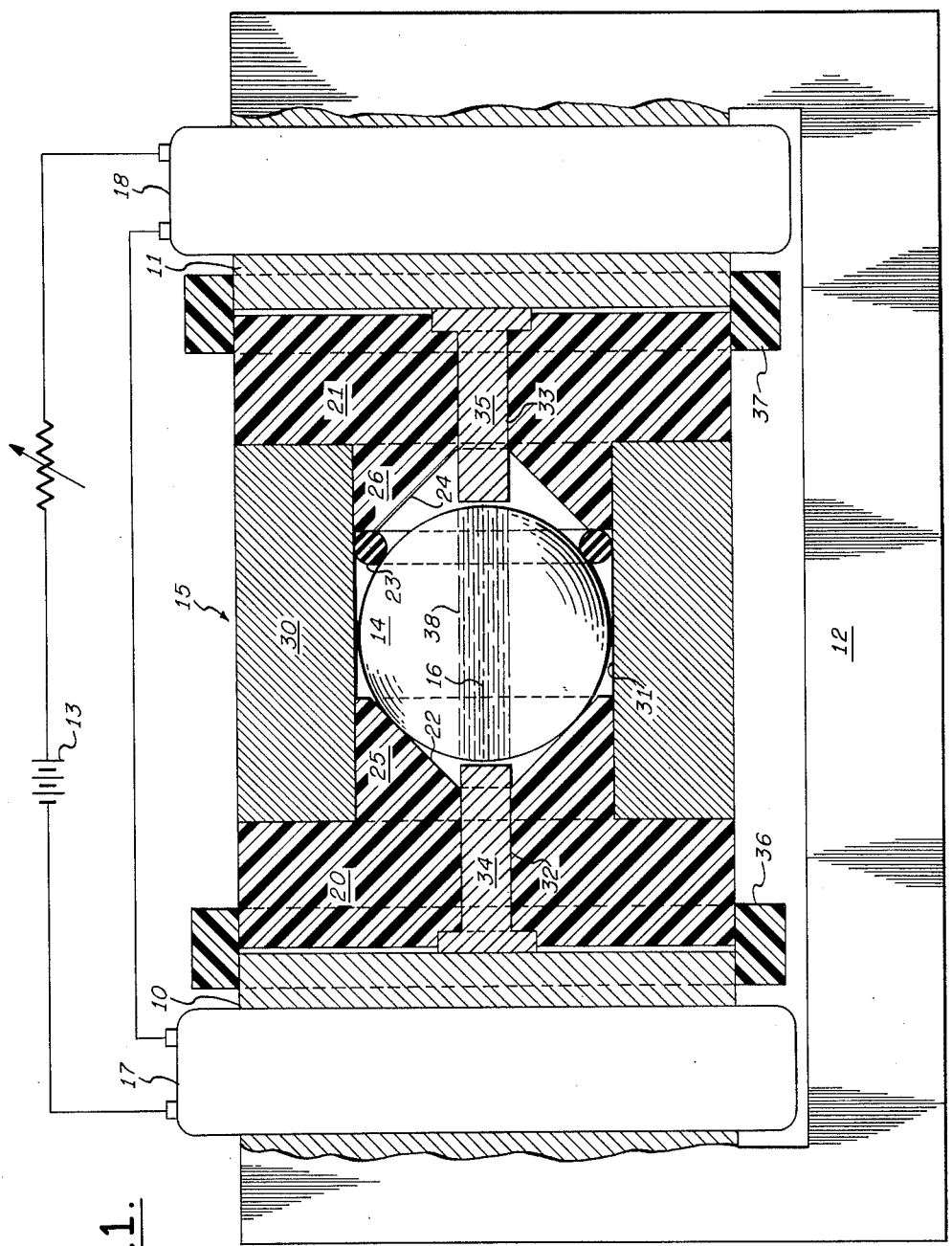

United States Patent Office 3,219,889
Patented Nov. 23, 1965

3,219,889
METHOD AND APPARATUS FOR MAGNETIZING AN ELEMENT
Andrey Polushkin, Flushing, N.Y., assignor to Sperry Rand Corporation, Great Neck, N.Y., a corporation of Delaware
Filed Nov. 6, 1962, Ser. No. 235,721
6 Claims. (Cl. 317—203)

This invention relates to locally magnetizing a portion of an element as well as to the method of locally magnetizing the element, and the magnetization apparatus utilized to locally magnetize the element. The method of the present invention is particularly suitable for magnetizing ferromagnetic elements in a precise predetermined manner.

Certain gyroscopic and other inertial devices used for navigation include a sensitive element having a spherical shape with a bar-type permanent magnet disposed within the sensitive element for pickoff and torquing purposes. A gyroscope of this type is disclosed in U.S. patent application S.N. 232,713 entitled Gyroscopic Apparatus of Gordon Watte, filed Oct. 24, 1962 and assigned to the same assignee as the present invention. The cost of manufacturing a sensitive element having a bar magnet disposed therein is extremely high and further it is difficult to achieve the desired sphericity and maintain the desired ball surface integrity. The border areas or edges between the original surface of the sphere and the additional fabricated surfaces are particularly susceptible to imperfections. Further, the physical integrity of the sphere is degraded as well as its geometric and mass distribution symmetry. The problem is even more complicated by the necessity to match thermal properties of different materials and to fasten them to each other in order that they maintain themselves integral and spherical under varying temperature conditions, vibration and rotational forces. It is, therefore, extremely desirable to provide a homogeneous sphere having the necessary localized magnetized characteristics for defining a magnetic axis.

It is thus an object of the present invention to provide a method for locally magnetizing portions of an element.

It is a further object of the present invention to provide a method for locally magnetizing portions of a homogeneous element in order that the magnetized portions define a magnetic axis and are adapted to cooperate with other apparatus to provide a signal representative of the orientation of said magnetic axis.

It is another object of the present invention to provide an element having localized magnetized portions.

It is an additional object of the present invention to provide a homogeneous element having localized magnetized portions which define a magnetic axis.

It is a further object of the present invention to provide magnetization apparatus for locally magnetizing portions of an element.

The above objects are achieved by utilizing a method which concentrates generated magnetic flux to magnetize predetermined portions of an element while removing magnetic flux from undesired portions of said element.

Figure 2:
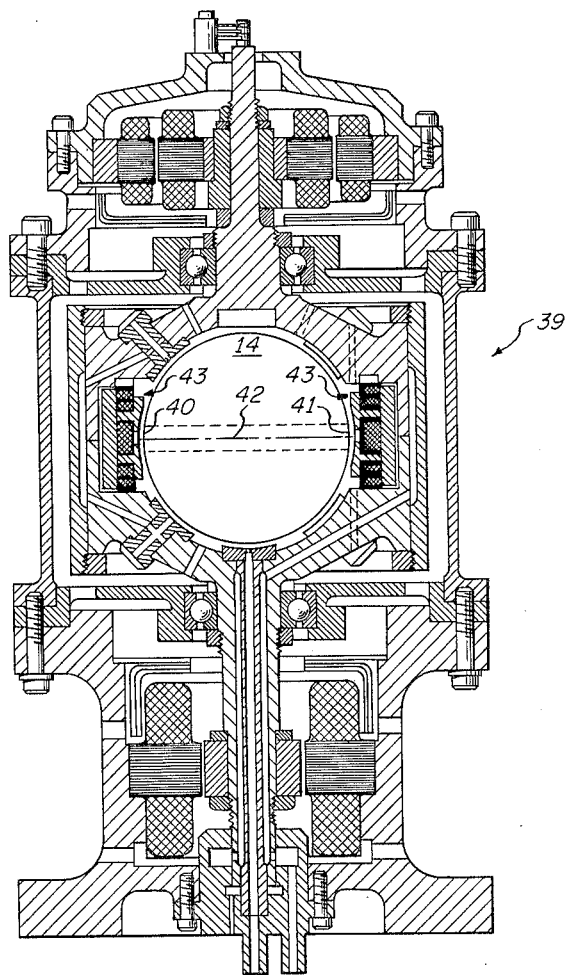

Referring now to the drawings,

FIG. 1 is an elevational view partly in section of the magnetization apparatus of the present invention; and FIG. 2 is an elevational view partly in section of a gyroscopic apparatus incorporating the present invention.

As disclosed in said application S.N. 232,713, the ball or sphere of the gyroscopic apparatus contains a bar-type permanent magnet with its magnetic axis perpendicular to the spin axis of the ball so that its plane of symmetry coincides with the equatorial plane of the ball.

As disclosed, the magnet is cooperative with a pick-off and torquing device which is designed under the assumption that a bar magnet of, for example, round cross-section of ⅜″ diameter is inserted into a ball of 2″ diameter. The manufacture of the ball including the bar magnet considering the required near-perfect symmetry of this insertion of the magnet within the ball and the required precise sphericity under all operating conditions, presented serious problems which are overcome by the present invention.

For purposes of example, the present invention will be described with respect to magnetizing localized areas of a spherical gyroscopic sensitive element of barium ferrite, although it will be appreciated that the present invention is applicable to magnetizing portions of other geometrical shapes and materials.

A ball that serves as an inertial element requires a combination of properties in order that it may be locally magnetized and suitable for gyroscopic application. The ball must be a ferromagnetic material of high coercive force capable of being magnetized and staying magnetized without losing its magnetization intensity outside of its magnetic system. Its mechanical and magnetic properties have to be stable. Further, its rotation in magnetic fields has to be lossless; this means that it has to be not only an electrical non-conductor but also have low hysteresis losses. In addition, it has to be homogeneous and hard enough to be shaped and maintain the desired sphericity. A suitable material has been found to be the ferroceramic barium ferrite ($BaFe_{12}O_{19}$).

The most important characteristic of barium ferrite is its extremely high coercive force (1800 oersteds) which is almost double that of the best alnico. The only other magnetic material of known higher coercive force is a platinum cobalt alloy which is not only very expensive but also highly conductive.

Another important characteristic of barium ferrite is that the portion of its demagnetization curve which is of interest is effectively a straight line which does not have a typical knee in the second quadrant thus practically eliminating any minor hysteresis loop and consequently hysteresis losses. A barium ferrite magnet has excellent long term magnetic stability. It is the only magnet material known today which does not show any change in flux with the time in the saturated state. Other magnets, including alnicos are made stable only by partial demagnetization. This material, however, can be used at its maximum residual induction.

Barium ferrite is manufactured by sintering at high temperatures from ball-milled particles of barium carbonate and iron oxide. The resultant product is a typical ceramic and, therefore, is non-metallic, inorganic, and non-conducting. It is also corrosion resistant and highly stable chemically. It does not contain critical materials and is not expensive. It has a non-reversible change at low temperatures. However, after this change, the magnet is stable for all higher temperatures (below the Curie point). To insure its stability in service, this magnet has to be exposed at least once to some temperature below that expected in service.

Proper magnetization of it requires that 10,000 oersteds be applied to the magnet. Because of its high coercive force, it can be magnetized either before or after assembly with the pole pieces of its magnetic system. It is so resistant to demagnetization that after the application of a demagnetizing field sufficient to reduce the flux to zero, the magnet will recover and have essentially the same magnetic characteristics as when originally magnetized.

Referring now to FIG. 1, a method of magnetizing precise localized portions of a homogeneous barium ferrite ball will be explained by means of a non-uniform magnetic field in order that the resulting magnetic pattern is equivalent to the magnetic pattern of a ball containing a bar-type magnet. A magnetic field is produced in the air gap defined by the opposed spaced pole pieces 10 and 11 of an electromagnet 12 that is energized through windings 17 and 18 by a D.C. source 13. The field density at any point between the pole pieces 10 and 11 is inversely proportional to the reluctance of the air gap of unit cross sectional area passing through it. The reluctance, itself, is proportional to the distance between pole pieces 10 and 11 and inversely proportioned to the permeability of the media therebetween. Since most of the materials which can be permanently magnetized are of low permeability, the ball 14 itself, will affect the magnetic field distribution only slightly while the highly permeable masses disposed around the ball 14, in a manner to be explained, influence the magnetic field distribution very strongly. This general principle, as applied to a particular geometric form, requires a special fixture in each case, and for purposes of example, the fixture described herein will be suitable for locally magnetizing portions of balls.

In order to produce a ball having a magnetization pattern equivalent to a ball with an inserted axially magnetized bar magnet, the ball 14 is placed into a fixture 15 that is symmetrical about an axis that is coincident with the magnetic axis 16 of the electromagnet 12. Centralizing support members 20 and 21 position the ball 14 on the magnetic axis 16 between the pole pieces 10 and 11. The ball 14 is secured between the inner conical surface 22 of the member 20 and a resilient O-ring 23 mounted on the member 21 and cooperative with its internal conical surface 24. The support members 20 and 21 have cylindrical portions 25 and 26 which slide within a hollow cylinder 30. The hollow cylinder 30 precisely aligns the members 20 and 21 by having an internal opening 31 common to both members 20 and 21. Further, the cylinder 30 is made of a highly permeable material and, thus, provides a drain or flux path for magnetic flux in a manner to be described. The diameter of the opening 31 is substantially the same as the diameter of the ball 14.

The members 20 and 21 have centrally disposed apertures 32 and 33 respectively, through which pole piece extensions 34 and 35 respectively protrude. One end of each of the pole pieces 34 and 35 connects to respective pole pieces 10 and 11 and may be considered extensions thereof for concentrating the magnetic flux. The other ends of the pole pieces 34 and 35 cooperate with diametrically opposed portions of the ball 14 that are coincident with the axis 16. The cross sectional area of pole pieces 34 and 35 is a function of the area of magnetization desired on the ball 14 which in this case is circular.

The assembled fixture 15 is positioned between the pole pieces 10 and 11 of the electromagnet 12 and secured therebetween by means of retaining rings 36 and 37. The retaining ring 36 locks the member 20 to the pole piece 10 while the retaining ring 37 locks the member 21 to the pole piece 11.

In operation, the ball 14 is placed within the opening 31 until it rests against the conical surface 22. The member 21 is then placed with its resilient O-ring 23 securely holding the ball 14 in a predetermined position in order that the diametrically opposed extremities of the pole pieces 34 and 35 are adjacent predetermined portions of the ball 14. The retaining rings 36 and 37 then lock the fixture 15 in place.

When the electromagnet 12 is energized, magnetic flux is distributed in three coaxial regions with respect to the magnetic axis 16, i.e. high flux density inner and outer regions with a low flux density intermediate region. The inner region high density flux passes through the center of the ball 14 in the direction of the axis 16 and magnetizes the desired internal portion thereof as a function of the cross sectional area of the pole piece extensions 34 and 35. The intermediate low density flux passes through the rest of the ball material while the external high density flux passes outside of the ball 14 through the cylinder 30. The cylinder 30 serves as a magnetic shunt by draining the intermediate region of low density flux from the ball 14 thereby leaving the desired localized magnetized portion 38 only of the ball 14.

The requirement explained above of having sharply defined circular diametrically opposed poles, for example ⅜" in diameter on the ball 14 requires corresponding magnetizing flux channelling. This is accomplished by providing high permeance flux paths by means of properly shaped pole piece extensions 34 and 35 made from high permeability ferromagnetic material. This high permeance path through the pole pieces 34 and 35 minimizes the undesired flux distribution and therefore, undesired magnetization, and increases the efficiency of the available magnetic field source created by the electromagnet 12. The pole pieces 34 and 35 must have a substantially higher magnetic saturation level than the magnetization intensity level at which the element has to be magnetized. This not only assures a high value of the pole material permeability at the magnetization level but also allows magnetization at the higher level if desired. A suitable material for the pole piece extensions 34 and 35 is an iron-cobalt alloy known commercially as Hiperco and available from the Westinghouse Electric Corporation. It has the highest magnetic saturation level (24,200 gauss) of any known commercial magnetic material and its permeability exceeds 10,000 at its maximum.

The magnetic behavior of the element to be magnetized depends on its permeability as well as on the permeability of the surrounding media. Since the permeability of barium ferrite differs very little from the permeability of the air, a barium ferrite sphere will be magnetized reproducing almost exactly the magnetizing field distribution because its presence does not affect the field distribution. Actual values of the magnetizing field are carefully selected in order to avoid operation of the fixture 15 with saturated flux carrying members in order to maintain higher difference of permeabilities and therefore flux densities in both regions passing through the ball 14.

The design of the fixture 15 is such that two conditions are always met:

(a) The position of the magnetic axis 16 and the pole pieces 34 and 35 is precisely controlled to coincide with a desired axis on the body 14 being magnetized.

(b) The fixture 15 in addition to positioning the sphere 14 to be magnetized, also performs a flux-shaping function. The pole pieces 10 and 11 of the magnetizing electromagnet 12 produce a relatively uniform field of rather large extent (compared to the ball 14). This field is redirected and concentrated by the fixture 15 in controlled zones so as to produce high magnetizing flux only through those spherical regions where high remanence is required. The fixture 15 makes judicious use of high-permeability pole piece extensions 34 and 35 which, operating at less than saturation, concentrate the flux across a diameter of the ball 14. Other high permeability pieces i.e. 30 envelop the ball 14 about its magnetic axis and serve as shunts to concentrate and remove other portions of the total impressed flux from regions of the ball 14 where low remanence is required.

Referring now to FIG. 2, a ball type of gyroscopic apparatus 39 is shown which is identical to that disclosed in said U.S. application S.N. 232,713, with the exception that the ball 14 is homogeneous and has localized magnetized areas 40 and 41 which serve the function of the bar magnet disposed within the ball of the gyroscopic apparatus of said application S.N. 232,713. The magnetized areas 40 and 41 define a magnetic axis 42 within the ball 14 and cooperate with the pickoff, torquer and saliency means 43 for purposes of detection, torquing and synchronous operation as fully explained in said application.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:
1. A method of magnetizing localized portions of a member including the steps of
   (1) generating a magnetic flux pattern,
   (2) concentrating the magnetic flux to an area approximately the size of the desired localized magnetized portion of said member,
   (3) placing said member with the area desired to be magnetized proximate to said concentrated flux area,
   (4) and removing magnetic flux from undesired portions of said member by placing high permeable masses proximate said undesired areas.
2. A method of magnetizing localized portions of a member including the steps of
   (1) generating a magnetic flux pattern in the air gap of flux generating means,
   (2) concentrating the magnetic flux to an area approximately the size of the desired localized magnetized portion of said member by permeable pole pieces responsive to said magnetic flux,
   (3) placing said member in said air gap with the area desired to be magnetized proximate to said concentrated flux area,
   (4) and removing magnetic flux from undesired portions of said member by placing high permeable masses proximate said undesired areas.
3. A method of magnetizing localized portions of a member including the steps of
   (1) generating a magnetic flux pattern in the air gap of an electromagnet,
   (2) concentrating the magnetic flux in said air gap to an area approximately the size of the desired localized magnetized portion of said member by permeable pole pieces responsive to said magnetic flux,
   (3) magnetizing said pole pieces to a higher mangetization intensity level than that desired of said member,
   (4) and removing magnetic flux from undesired portions of said member by placing high permeable masses proximate said undesired areas.
4. An element having localized magnetized portions thereof comprising
   (1) an element having ferromagnetic portions of high coercive force,
   (2) a portion of said ferromagnetic portions being magnetized,
   (3) and the remaining portions of said ferromagnetic portions being substantially unmagnetized thereby providing an element having localized magnetized portions thereof.
5. An element having localized magnetized portions thereof comprising
   (1) a homogeneous sensitive element of ferromagnetic material of high coercive force,
   (2) predetermined localized portions of said element being magnetized, and
   (3) said magnetized portions providing a predetermined magnetic axis through said sensitive element.
6. Apparatus for magnetizing a localized area of an element comprising
   (1) magnetic flux generation means,
   (2) magnetic flux concentration means responsive to said magnetic flux generation means for concentrating the magnetic flux to a predetermined area,
   (3) means for aligning an element to be magnetized in order that the portion thereof to be magnetized is proximate said flux concentration means,
   (4) and highly permeable flux draining masses proximate other areas of said element for draining the magnetic flux therefrom.

References Cited by the Examiner
UNITED STATES PATENTS

| | | | |
|---|---|---|---|
| 2,875,618 | 3/1959 | Altman | 75—5.6 |
| 2,897,417 | 7/1959 | MacDonough et al. | 317—203 |
| 2,924,758 | 2/1960 | Weber | 317—203 |
| 2,936,408 | 5/1960 | Bennetot | 317—201 |
| 3,139,567 | 6/1964 | Atkinson | 317—203 |

JOHN F. BURNS, *Primary Examiner.*